(12) United States Patent
Okada et al.

(10) Patent No.: US 7,397,499 B2
(45) Date of Patent: Jul. 8, 2008

(54) IMAGE PICKUP DEVICE AND CHROMATIC ABERRATION CORRECTION METHOD

(75) Inventors: Miyuki Okada, Kanagawa (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 649 days.

(21) Appl. No.: 10/506,848

(22) PCT Filed: Mar. 5, 2003

(86) PCT No.: PCT/JP03/02589

§ 371 (c)(1),
(2), (4) Date: Sep. 3, 2004

(87) PCT Pub. No.: WO03/075557

PCT Pub. Date: Sep. 12, 2003

(65) Prior Publication Data

US 2005/0168614 A1  Aug. 4, 2005

(30) Foreign Application Priority Data

Mar. 5, 2002  (JP) ............................ 2002-059191

(51) Int. Cl.
*H04N 5/228* (2006.01)

(52) U.S. Cl. .............................. 348/208.13; 348/222.1; 348/231.3; 348/208.2; 348/208.4

(58) Field of Classification Search ................................ 348/208.99–208.16, 222.1
See application file for complete search history.

(56) References Cited

U.S. PATENT DOCUMENTS

| | | | | |
|---|---|---|---|---|
| 5,274,457 A | * | 12/1993 | Kobayashi et al. | 348/231.9 |
| 5,502,484 A | * | 3/1996 | Okada | 348/208.6 |
| 5,657,080 A | * | 8/1997 | Sekine | 348/208.5 |
| 6,380,974 B1 | * | 4/2002 | Hieda et al. | 348/222.1 |
| 7,239,342 B2 | * | 7/2007 | Kingetsu et al. | 348/208.4 |
| 7,245,319 B1 | * | 7/2007 | Enomoto | 348/222.1 |

FOREIGN PATENT DOCUMENTS

| | | |
|---|---|---|
| EP | 0 401 858 | 12/1990 |
| EP | 0 410 419 | 1/1991 |

(Continued)

*Primary Examiner*—Ngoc-Yen Vu
*Assistant Examiner*—David Holt
(74) *Attorney, Agent, or Firm*—Frommer Lawrence & Haug LLP; William S. Frommer; Thomas F. Presson (57) ABSTRACT

An image pick-up device and a chromatic aberration correcting method are provided in which a satisfactory correction processing can be performed even when the image pickup device, such as a camera, simultaneously performs shake correction. An output signal from a camera-signal processing circuit is selected by a selector switch and is supplied to a chromatic aberration correcting unit. An angular velocity due to the camera shake is detected using sensors and the detected signal is supplied to a camera shake correcting vector calculating unit. A driving state of a camera lens is supplied to a conversion-ratio calculating unit. An optical axis centered shift vector of camera lens is obtained from the camera shake correcting vector and is supplied to the correcting unit. Accordingly the picture-quality deterioration caused in the miniaturized camera lens can be compensated by processing the captured image signal, and also a satisfactory correction processing can be performed even when the camera shake correction is performed simultaneously.

8 Claims, 4 Drawing Sheets

FOREIGN PATENT DOCUMENTS

| | | |
|---|---|---|
| EP | 410419 A2 * | 1/1991 |
| EP | 410419 B1 * | 5/1995 |
| JP | 4-215378 | 8/1992 |
| JP | 5-3568 | 1/1993 |
| JP | 5-22697 | 1/1993 |
| JP | 5-328283 | 12/1993 |
| JP | 6-237411 | 8/1994 |
| JP | 8-149403 | 6/1996 |

* cited by examiner

IMAGE PICKUP DEVICE AND CHROMATIC ABERRATION CORRECTION METHOD

TECHNICAL FIELD

The present invention relates to an apparatus for taking a picture and a method of correcting chromatic aberration, which are capable of favorably correcting the chromatic aberration that is caused, for example, when picking up image light passing through a camera lens, and particularly relates to those which are suitable for use in a video camera or a digital still camera, for example.

BACKGROUND ART

A video camera, a digital still camera or the like each includes a camera lens, an image pickup means for converting the image light passing through the camera lens into an electric image signal, and a camera-signal processing means for processing the image signal. An output signal from the camera-signal processing means is output to the outside or is recorded in a recording medium.

In this connection, a so-called optical lens is employed for the camera lens. The image light passing through the camera lens from an object is separated into light of three primary colors of red (R), green (G), and blue (B) by, for example, a spectro-filter, and forms an image on a picture making plane of the image pickup means including a CCD, CMOS sensor and the like, and then converted into an electric image signal.

On the other hand, miniaturization of the video camera or digital still camera is rapidly pushed forward and miniaturization of the camera lens is also demanded. Accordingly, in order to miniaturize the camera lens, ones as before in which multiple lenses are combined and used is often replaced with a small one using a single lens or a few lenses. However, with such miniaturized camera lens, it will be difficult to sufficiently suppress the deterioration of picture quality caused in lens due to so-called chromatic aberration and the like.

Figure 4:
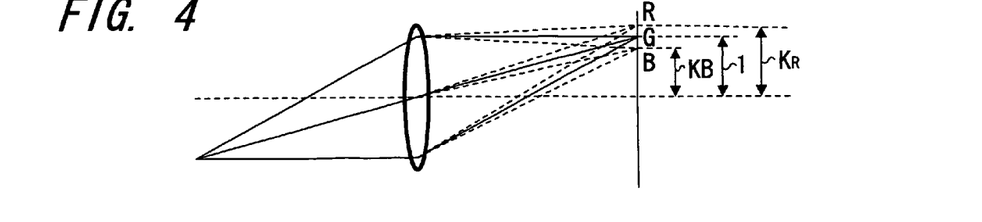
FIG. 4 is a diagram for explaining the chromatic aberration.

Specifically, in the optical lens, a refractive index of the lens differs at each wavelength of red (R), green (G), and blue (B) separated by, for example, a spectro-filter, so that a phenomenon occurs in which a red (R) image is formed outside a green (G) image and a blue (B) image is formed inside the green (G) image, as shown in, for example, FIG. 4. Therefore, there is a problem in which even in the case where a monochrome image is taken, for example, a color blurring (color shift) appears at an edge of the image.

Thus, in order to suppress the deterioration of picture quality such as color blurring or resolution lowering due to such chromatic difference of magnification (also called lateral chromatic aberration), conventionally a large number of lenses were combined to perform correction inside the camera lens. However, in the above-described miniaturized camera lens, it becomes difficult to sufficiently suppress such deterioration of picture quality only inside the camera lens.

To cope with this difficulty, an apparatus disclosed in, for example, Japanese Published Patent Application No. H5-3568 is previously proposed as a means for suppressing the above-described deterioration of picture quality such as color blurring or resolution lowering due to the chromatic difference of magnification.

Specifically, the apparatus disclosed in the Patent Gazette is an apparatus in which image signals of each color of R, G, B derived from a CCD (image pickup device) are once converted into digital data and temporarily stored in each individual field memory, respectively. Further, based on a driving state of the camera lens such as a zoom focal length and a focal position, each picture stored in each field memory is enlarged or reduced by moving individually vectors of entire pixels in each field memory and then R, G, B are synthesized again for correcting the color shift occurring in the camera lens of a video camera.

Figure 5:
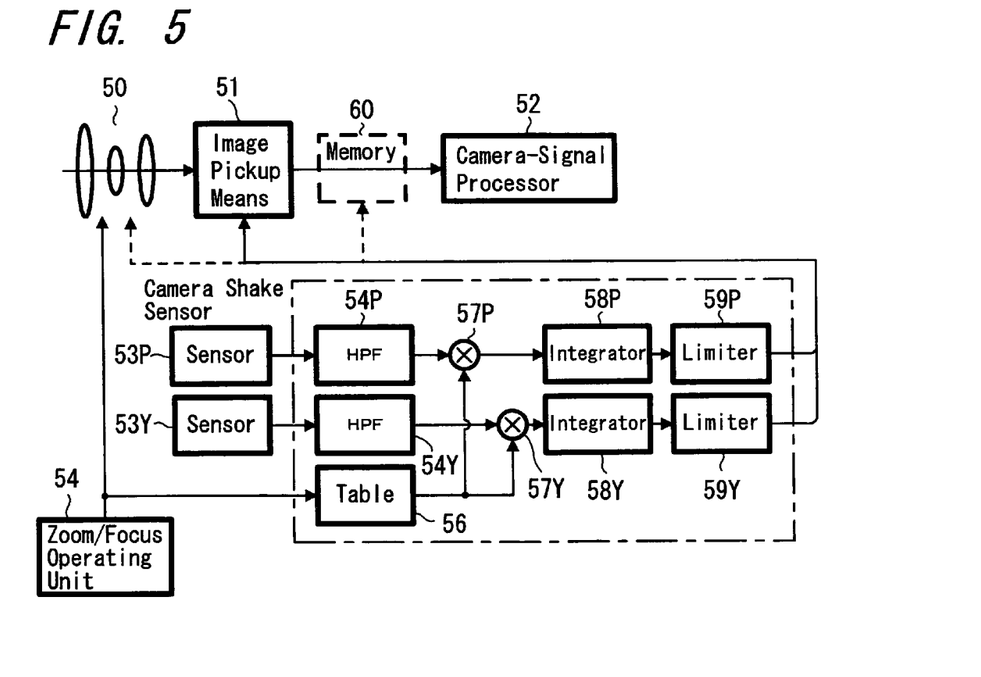
FIG. 5 is a block diagram for explaining a conventional camera shake correcting means.

Incidentally, when a picture is taken by a small-sized video camera or digital still camera, for example, held by hand, there is a risk that an image blurring due to so-called camera shake or the like may happen. Thus, for the purpose of removing the disadvantage such as the image blurring, a so-called camera shake correction device is installed in the small-sized video camera or digital still camera. FIG. 5 shows a block diagram of the video camera or digital still camera in which the camera shake correction device is installed.

In FIG. 5, image light from an object (not shown) passing through a camera lens 50 forms an image on the picture making plane of an image pickup means 51 including CCD, CMOS sensors and the like and is converted into an electric image signal including, for example, an intensity (Y) signal and two color-difference (Cb, Cr) signals. The image signal is supplied to a camera-signal processing circuit 52, where signal processing such as a so-called γ correction is made to form an ordinary image signal used for general-purpose video equipment. On the other hand, in order to detect the so-called camera shake, angular velocities due to the camera shake in Pitch and Yaw directions are detected using, for example, two gyro-sensors 53P and 53Y in this example. Moreover, for example, a zoom focal length of the camera lens 50 operated by a user is detected from the camera lens 50. Additionally, to detect the zoom focal length, an operational signal from a manual input means 54 operated by a user for example, can be employed.

The angular-velocity signals detected by the gyro-sensors 53P and 53Y are supplied to high-pass filters (HPF) 55P and 55Y, where DC components are removed; on the other hand, data on the above-described zoom focal length is supplied to a table 56 and necessary operational coefficients are found from those data; and the operational coefficients are supplied to multipliers 57P and 57Y, and are multiplied there by signals from the high-pass filters 55P and 55Y. Output signals from the multipliers 57P and 57Y are further supplied to integrators 58P and 58Y, respectively.

Therefore, information on angles of the camera lens 50 varied by the camera shake is derived from those integrators 58P and 58Y. The angular information on the camera shake is supplied to, for example, the image pickup means 51 through limiter circuits 59P and 59Y and a position at which the image signal is taken out from the image pickup means 51 is controlled. Specifically, for example, the image pickup means is provided with a picture making plane wider than a size of the original picture, and a necessary picture is taken out from the picture making plane so as to cancel out the fluctuation due to camera shake.

In this way, the so-called camera shake correction is performed in the small-sized video camera or digital still camera. Additionally, the following methods are practiced as a means for performing the camera shake correction other than controlling the position to take out the image signal from the camera means 51 as described above, in which all image signals captured by the image pickup means 51 are once stored in a memory 60 and then a position at which the image signal is read out from the memory 60 is controlled, or a partial lens position of the camera lens 50 is shifted for correction.

Figure 6:
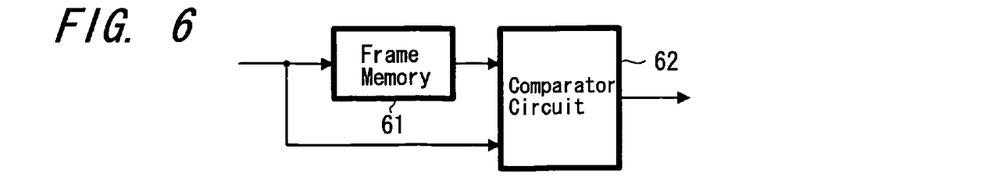
FIG. 6 is a diagram for explaining thereof.

Furthermore, the information on angles of the camera lens 50 varied by the camera shake can also be taken out by the other means than that using the above-described gyro-sensors 53P and 53Y. For example, as shown in FIG. 6, by storing the image signal from the image pickup means 51 in a frame memory 61 and then comparing the image signals prior to and subsequent to the frame memory 61 with each other by a comparator circuit 62, it is possible to calculate the angular information on the camera shake from displacement of an image of the background and the like. In addition, the calculated angular information on camera shake can be utilized in all the above-described camera shake correction means.

However, it is proved that, when such camera shake correction is performed, if the compensation for the picture-quality deterioration such as color blurring or resolution lowering due to the chromatic difference of magnification is attempted, a sufficient correction cannot be made. Specifically, in the above-described device, when vectors of whole pixels in each field memory are moved individually, the center must correspond with an optical axis of the camera lens; however, if the camera shake correction is performed, the position of the optical axis is moved and it is difficult to correspond with the center.

For this reason, the compensation for picture-quality deterioration due to chromatic aberration, for example could not be performed simultaneously with the camera shake correction in the past. However, in conventional kinds of system having a small number of pixels, the picture-quality deterioration, for example, due to chromatic aberration is less noticeable, particularly when taking a picture requiring the camera shake correction. Lately, however, as the result that the increase in the number of pixels of a picture has been demanded, the influence of the picture-quality deterioration due to chromatic aberration or the like becomes conspicuous under every situation.

The present invention is made in view of the above and aims to solve the following problems. Conventionally, as the camera lens is miniaturized, the problem of picture-quality deterioration such as color blurring and resolution lowering is raised due to the chromatic difference of magnification, and it is difficult to sufficiently suppress the picture-quality deterioration only by the camera lens, and particularly when the compensation for such picture-quality deterioration is performed by enlarging or reducing a picture of each color, the problem is posed that the camera shake correction cannot be performed simultaneously therewith.

DISCLOSURE OF THE INVENTION

According to an aspect of claim 1 of the present invention, a means for enlarging or reducing a picture of each color of primary color signals and a means for detecting a driving state of a camera lens and an amount of camera shake correction are used to control a conversion coefficient for enlarging or reducing the picture and an optical axis centered coordinate depending on a detected output.

Accordingly, the picture-quality deterioration caused in the miniaturized camera lens can be compensated by processing the captured image signal, and even when the camera shake correction is performed simultaneously therewith, a satisfactory correction processing can be performed.

According to an aspect of claim 2 of the present invention, a signal-converting means for converting an output signal from a resolution changing means into an image signal for outputting to the outside or for recording, or vice versa, an outside outputting means for outputting the image signal to be output to the outside, and/or a recording and reproducing means for recording the image signal to be recorded in a recording medium or for reproducing it therefrom are provided, so that it is also possible to record the corrected image signal in a recording medium such as a flexible disc or a semiconductor memory card or to output that signal to an external video equipment and the like.

According to an aspect of claim 3 of the present invention, an output signal from a camera-signal processing means can be recorded in a recording medium by the recording and reproducing means, and also information on the driving state of the camera lens and the amount of camera shake correction detected by the detection means when taking a picture is recorded in the recording medium together with the output signal from the camera-signal processing means, so that a satisfactory image signal can be recorded even when there is no time to make the correction processing in consecutive photographing or the like.

According to an aspect of claim 4 of the present invention, a selector switch means for selecting between the output signal from the camera-signal processing means and an image signal from an arbitrary external input means or from the recording and reproducing means is provided, and a signal from the selector switch means is supplied to a chromatic signal conversion means and also a user interface is provided in a control means for arbitrarily setting a conversion coefficient of enlargement or reduction and an optical axis centered coordinate, so that a satisfactory correction processing of an image signal recorded by another camera system can be performed.

According to an aspect of claim 5 of the present invention, the information on the driving state of the camera lens and the amount of camera shake correction detected by the detection means when taking a picture is recorded together with the image signal in the recording medium reproduced by the recording and reproducing means, and the conversion coefficient for enlargement or reduction as well as the optical axis centered coordinate in the resolution changing means are controlled depending on the information reproduced by the recording and reproducing means, so that a satisfactory correction processing of the image signal recorded in the recording medium is performed using the same camera device.

Furthermore, according to an aspect of claim 6 of the present invention, a mean s for enlarging or reducing a picture of each color of primary color signals and a means for detecting a driving state of a camera lens and an amount of camera shake correction are used to control a conversion coefficient of enlarging or reducing the picture and an optical axis centered coordinate depending on the detected output.

Accordingly, the picture-quality deterioration caused in the miniaturized camera lens can be compensated by processing the captured image signal, and even when the camera shake correction is performed simultaneously therewith, a satisfactory correction processing can be performed.

According to an aspect of claim 7 of the present invention, the output signal from a resolution changing means is converted into an image signal for outputting to the outside or for recording, and then the image signal to be output to the outside is output and/or the image signal to be recorded is recorded in a recording medium, so that the corrected image signal can be recorded in the recording medium such as a flexible disc or semiconductor memory card, or can be output to an external video equipment and the like.

According to an aspect of claim 8 of the present invention, the output signal from a camera-signal processing means can be recorded in the recording medium, and also the information on the driving state of the camera lens and the amount of camera shake correction detected while taking a picture is recorded in the recording medium together with the output signal, so that even when there is no time for correction processing in consecutive photographing or the like, a satisfactory recording of image signal can be performed.

According to an aspect of claim 9 of the present invention, a selector switch means for selecting between the output signal from the camera-signal processing means and an image signal from an arbitrary external input or recording medium is provided, a signal from the selector switch means is converted into at least three primary color signals to perform enlargement or reduction of a picture of each color of the primary color signals, and a conversion coefficient of enlargement or reduction and an optical axis centered coordinate are arbitrarily set, so that a satisfactory correction processing of an image signal recorded by other camera devices can be favorably performed as well.

According to an aspect of claim 10 of the present invention, the information on the driving state of the camera lens and the amount of camera shake correction detected when capturing an image signal is recorded in the recording medium together with the image signal, and the conversion coefficient of enlargement or reduction as well as the optical axis centered coordinate are controlled depending on the information reproduced, so that a satisfactory correction processing of image signal recorded in the recording medium can be performed using the same camera device.

BEST MODE FOR CARRYING OUT THE INVENTION

In the present invention, a means for enlarging or reducing a picture of each color of primary color signals and a means for detecting a driving state of a camera lens and an amount of the camera shake correction are used to control a conversion coefficient of enlarging or reducing the picture as well as an optical axis centered coordinate depending on a detected result, so that the picture-quality deterioration caused in the miniaturized camera lens can be compensated by processing the captured image signal, and also even when the camera shake correction is performed simultaneously, a satisfactory correction processing can be made.

Figure 1:
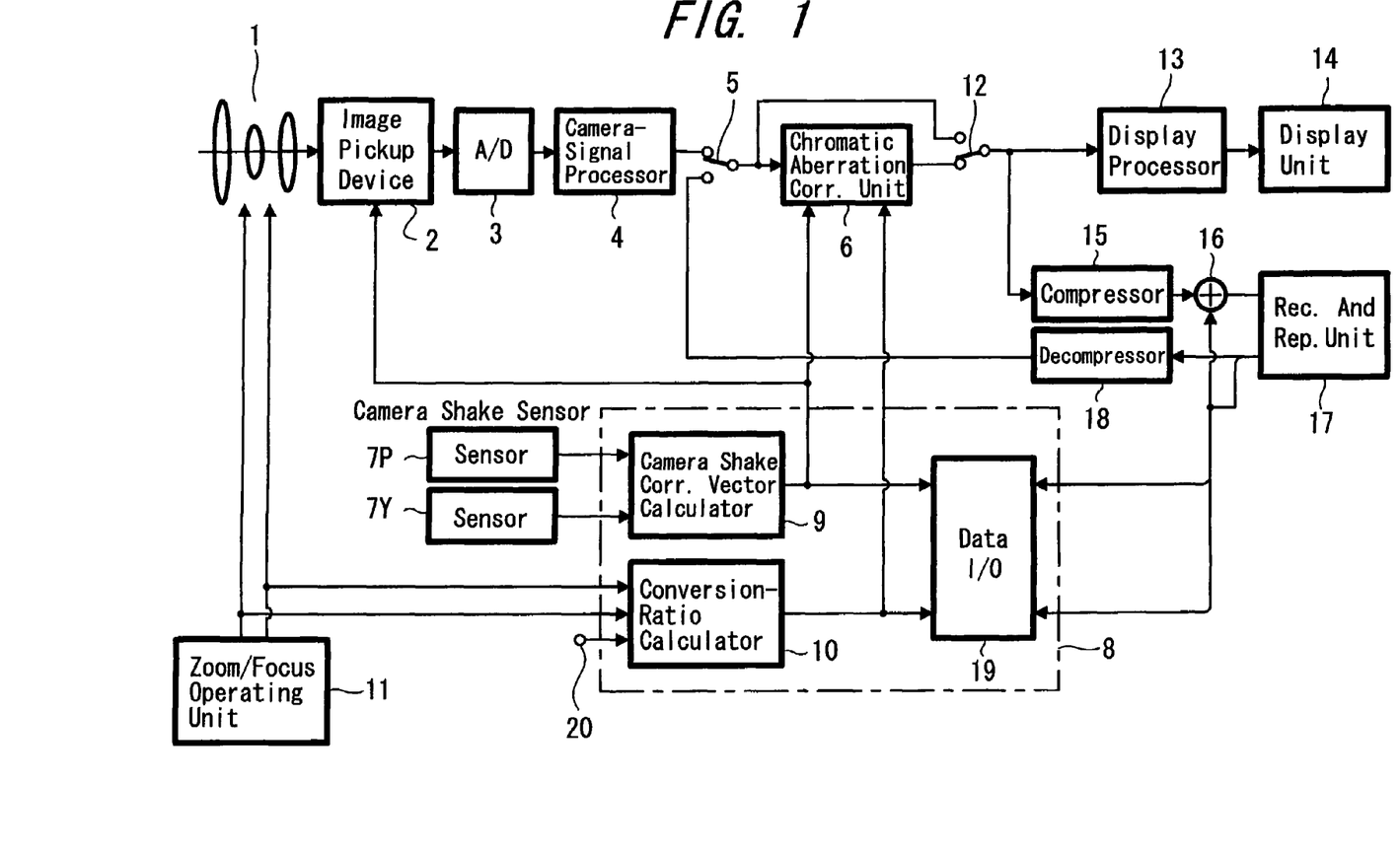
FIG. 1 is a block diagram showing an embodiment of a configuration of a video camera or digital still camera, to which a picture taking apparatus and a chromatic aberration correcting method according to the present invention are applied.

The present invention will be described below with reference to accompanying drawings. FIG. 1 is a block diagram showing an embodiment of a configuration of a video camera or digital still camera to which a picture taking apparatus and chromatic aberration correcting method according to the present invention are applied.

In FIG. 1, image light from an object (not shown) passing through a camera lens 1, forms an image on a picture making plane of an image pickup means 2 including a CCD or CMOS sensor and the like, and is converted into an electric image signal including, for example, a intensity (Y) signal and two color-difference (Cb, Cr) signals.

This image signal is supplied to an A/D converter circuit 3, where the image signal in an analog form is converted into image data in a digital form. The converted image data is supplied to a camera-signal processing circuit 4, where a signal processing such as the so-called γ correction is digitally performed to form an ordinary image signal used for general-purpose video equipment. An output signal from the camera-signal processing circuit 4 is selected by a selector switch 5 and is supplied to a chromatic aberration correcting unit 6. On the other hand, angular velocities in Pitch and Yaw directions due to the camera shake are detected using, for example, two sensors 7P and 7Y, and the detected signal is supplied to a camera shake-correcting-vector calculating unit 9 of, for example, a control microcomputer 8. Further, a driving state of the camera lens 1 such as a zoom focal length and focal position is detected and supplied to a conversion-ratio calculating unit 10. In addition, to detect the driving state of camera lens 1, for example, an operational signal from a manual input means 11 operated by a user can be employed.

In the camera shake-correcting-vector calculating unit 9 of the control microcomputer 8, for example, an operation corresponding to the processing indicated by surrounding with a dot-and-dash line in the circuit configuration, for example, shown in FIG. 5 is performed, thereby deriving the information on angles of the camera lens 1 fluctuated by camera shake. The camera shake correcting vector calculated by the control microcomputer 8 is further supplied to, for example, the image pickup means 2 to perform the camera shake correction.

Concurrently, a shift vector with the optical axis centered in the camera lens 1 is obtained from the camera shake correcting vector and is supplied to the chromatic aberration correcting unit 6. In other words, the camera shake correcting vector corresponds to displacement from the center that is the optical axis of the camera lens 1, and in accordance with the camera shake correcting vector, for example, a position for taking out the image signal from the image pickup means 2 is controlled. Thus, by inverting positive and negative signs of the camera shake correcting vector, the optical axis centered shift vector in the taken-out image signal can be obtained.

Further, the conversion ratio of each color calculated in the control microcomputer 8 is supplied to the chromatic aberration correcting unit 6. Specifically, ratios KR, KB concerning the image fluctuation due to chromatic aberration, for example, shown in FIG. 4 [KR is a ratio of the size of red (R) image to the size of green (G) image and KB is a ratio of the size of blue (B) image to the same, where the size of green (G) image is assumed to be 1.] depend on the driving state of the camera lens 1 such as the zoom focal length and focal position. Therefore, the ratios KR, KB can be obtained from the detected signal of the driving state.

Figure 2:
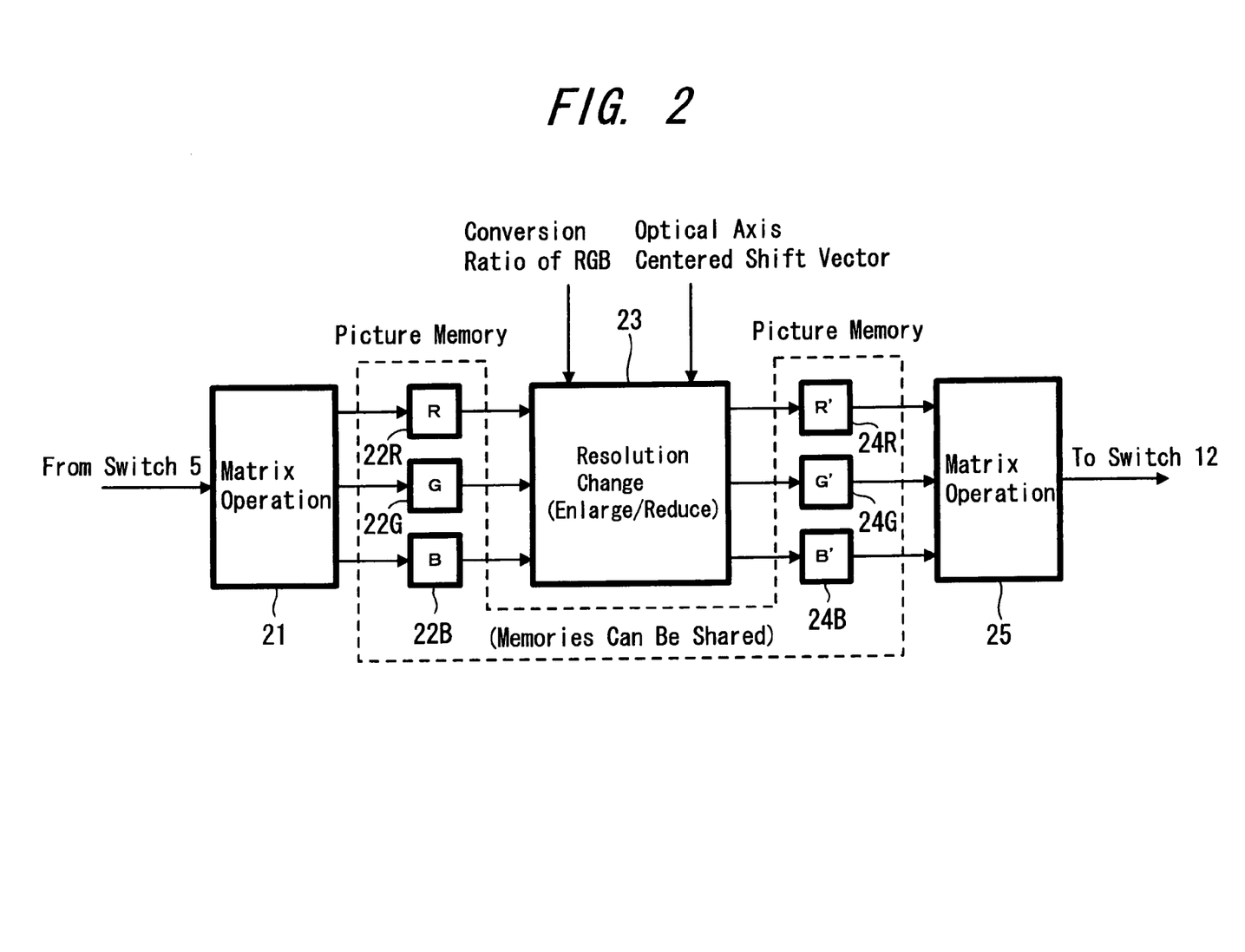
FIG. 2 is a block diagram showing an embodiment of a configuration of the relevant part of FIG. 1.

The chromatic aberration correcting unit 6 performs such processing as shown in, for example, FIG. 2. Specifically, the signal from the switch 5 is supplied to a matrix operation circuit 21, where the above-described intensity (Y) signal and two color-difference signals (Cb, Cr) are converted to, for example, three primary color (R, G, B) signals. The converted three primary color (R, G, B) signals are written into input-side picture memories 22R, 22G, 22B, respectively, and the written image data is supplied to a resolution changing circuit 23 for enlarging or reducing the picture.

Furthermore, the above-described conversion ratio data and the shift vector data of optical axis of the camera lens are supplied to the resolution changing circuit 23, where the optical axis centered position in each picture of red (R), green (G), blue (B) is determined in accordance with the above-described shift vector data of optical axis of the camera lens. Around this position, the resolution changing of enlarging or reducing the picture is performed in accordance with the above-described conversion ratio data.

Moreover, the image data from the resolution changing circuit 23 are written into output-side picture memories of 24R, 24G, and 24B. Additionally, picture memories 22R, 22G, 22B and picture memories 24R, 24G, 24B can be provided in common. The image data written into the picture memories 24R, 24G, 24B are further read out and then supplied to a matrix operation circuit 25, where, for example, the three primary color (R, G, B) signals are converted to a intensity (Y) signal and two color-difference (Cb, Cr) signals.

Figures 3A, 3B:
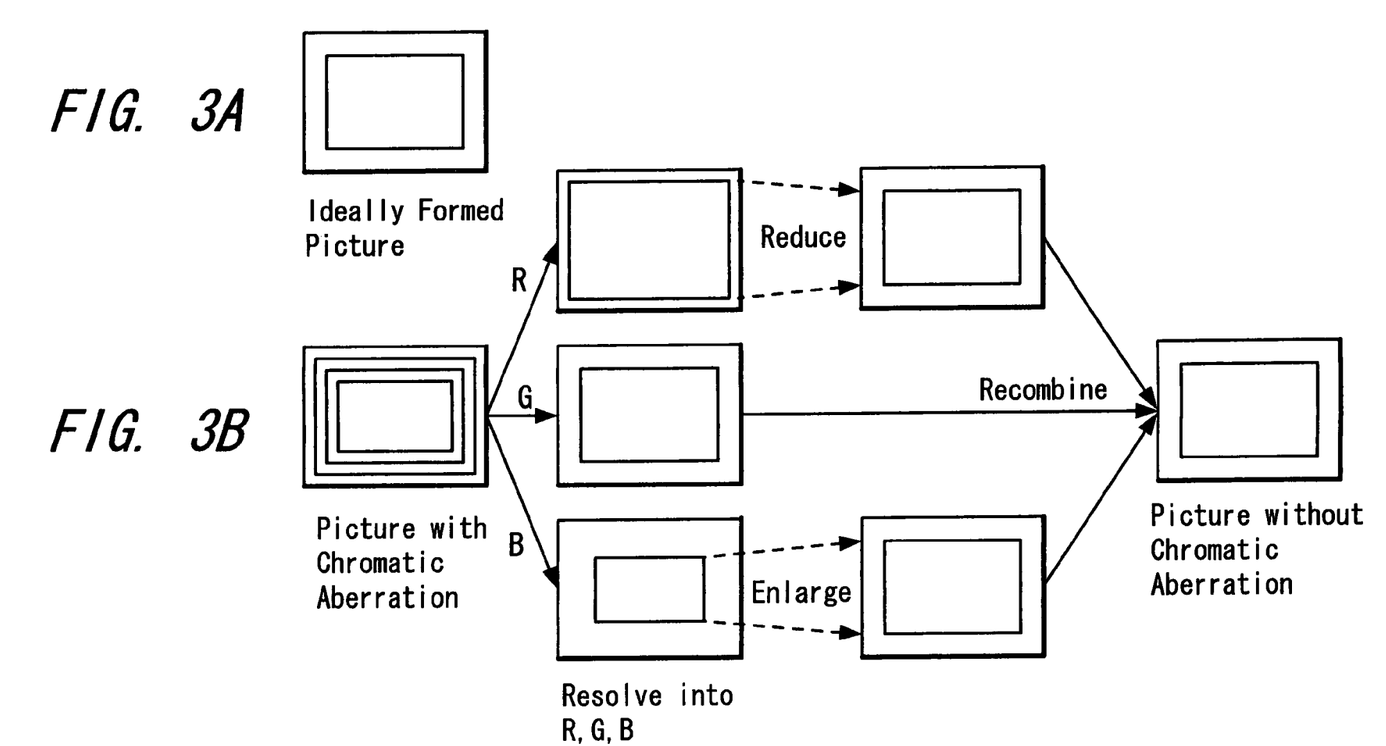
FIGS. 3A and 3B are diagrams for explaining operation thereof.

Accordingly, in the resolution changing circuit 23, for example, when a picture with chromatic aberration as shown on the left end of FIG. 3B is supplied instead of an ideally formed picture, for example, as shown in FIG. 3A, this picture is resolved into three primary color (R, G, B) pictures, of which for example, red (R) picture is reduced and blue (B) picture is enlarged to make the size of each picture equal. Further, these pictures of three primary colors (R, G, B) are recombined into a picture close to ideally formed one as shown on the right end of FIG. 3B.

This image data is further supplied to the matrix operation circuit 25. As a result, from the chromatic aberration correcting unit 6, the image data recombined into the picture close to ideally formed one in the above-described resolution changing circuit 23 is taken out after being again converted to, for example, the intensity (Y) signal and two color-difference (Cb, Cr) signals. The intensity (Y) signal and two color-difference (Cb, Cr) signals taken out from the chromatic aberration correcting unit 6 are switched over by the selector switch 12 to an input signal of the chromatic aberration correcting unit 6.

The signal selected by the selector switch 12 is supplied to a display processing circuit 13, where, for example, the intensity(Y) signal and two color-difference (Cb, Cr) signals are converted to a predetermined form of display signal, and this converted image data is supplied to a display unit 14 such as a liquid crystal display for making display. Alternatively, the signal selected by the selector switch 12 can be supplied to an outside outputting means (not shown) for outputting to external video equipment and the like.

Moreover, the signal selected by the selector switch 12 is supplied to a data-compression circuit 15 and the compressed image data is supplied to a recording and reproducing device 17 including a recording medium such as a flexible disc or semiconductor memory card through a data-insertion circuit 16. Furthermore, a reproduced signal from the recording and reproducing device 17 is supplied to a data-expansion circuit 18. The expanded image data is then supplied to the selector switch 5, by which that image data can be selected instead of the output signal from the above-described camera-signal processing circuit 4.

Therefore, in this apparatus, with respect to the image data captured by, for example, the image pickup means 2, chromatic aberration is corrected by the chromatic aberration correcting unit 6 to be displayed at the display unit 14; and also this corrected image data is recorded in a recording medium in the recording and reproducing device 17. Also, with respect to the image data reproduced from the recording medium by the recording and reproducing device 17, chromatic aberration is corrected by the chromatic aberration correcting unit 6 to be displayed at the display unit 14; and also this corrected image data is recorded in the recording medium in the recording and reproducing device 17.

Accordingly, with respect to the image data which was recorded in the recording medium, for example, without chromatic aberration being corrected when a picture is taken, chromatic aberration is also corrected to be displayed at the display unit 14; and also, the image data already recorded in the recording medium can be rewritten by the recording and reproducing device 17 using that corrected image data. That is, it is possible to only record when there is no time to perform correction such as when consecutively photographing, and is possible to correct data on reproduction for rerecording the corrected data.

In this case, by recording, for example, the data of an optical axis centered shift vector and the data of a conversion ratio when taking a picture together with the image data, it is possible to smoothly make the correction processing for chromatic aberration of the image data on reproduction.

Specifically, in the above-described apparatus, for example, the optical axis centered shift vector data from the camera shake-correcting-vector calculating unit 9 and the conversion ratio data from the conversion ratio calculating unit 10 are converted into a predetermined data form by a data I/O circuit 19 to be inserted into image data from the data-compression circuit 15 in the data-insertion circuit 16. Further, at the time of reproduction, data contained in a reproduced signal from the recording and reproducing device 17 is taken out by the data I/O circuit 19 to be supplied to the chromatic aberration correcting unit 6.

Thus, in the case of having no time to make the correction when consecutive photographing or the like is performed, the optical axis centered shift vector data when taking a picture and data of conversion ratio are recorded together with the image data. On reproduction, by using the optical axis centered shift vector data and the data of conversion ratio which are recorded together, the correction processing for chromatic aberration of image data can be smoothly operated and also the corrected data can be rerecorded.

However, only if the recording and reproduction are performed in the same camera system, the correction as described above can be performed using the data of optical axis centered shift vector when taking a picture and the data of conversion ratio. Because, each center that is an optical axis of the camera lens is not exactly the same even in those of the same kind, and it is impossible to correct data recorded by other camera devices. Thus, whether the recording and reproduction are performed by the same camera device or not can be discriminated by recording, for example, an individual ID code of each unit together with data thereof.

Moreover, in the above-described apparatus, for example, the conversion-ratio calculating unit 10 is provided with an arbitrary user interface input 20, so that the above-described data of conversion ratio may arbitrarily be altered and the ratio of correction used in the chromatic aberration correcting unit 6 can arbitrarily be set. This makes it possible to also perform the desired correction using the user interface input 20, for example, even if the image data is recorded by other camera devices or the data of conversion ratio is not recorded together with the image data.

Furthermore, when the desired correction is made using such user interface input 20, by arbitrarily selecting the image data using the selector switch 12 for example, it is possible to arbitrarily select between a picture before the correction and a picture after the correction in the chromatic aberration correcting unit 6 for displaying at the display unit 14. Accordingly, the picture before the correction and the picture after the correction can easily be compared and a user's operation of making the desired correction can be performed smoothly.

In addition, when the display unit 14 is used, for example, as a viewfinder or when the already corrected image data is displayed at the display unit 14 without passing through the chromatic aberration correcting unit 6, the selector switch 12 is also utilized to select image data. Further, the selector switch 12 is utilized as well when only recording is performed without making the correction when consecutively photographing or the like is performed. However, if the chromatic aberration correcting unit 6 is provided with a through mode in which input data is output as it is, it can also be utilized in place of the selector switch 12.

Accordingly, in the above-described embodiment, the means for enlarging or reducing a picture of each color of the primary color signals and the means for detecting the driving state of a camera lens as well as the amount of camera shake correction are used to control the conversion coefficient for enlarging or reducing the picture and the optical axis centered coordinate, depending on the detected output; so that the picture-quality deterioration caused in the miniaturized camera lens can be compensated by processing the captured image signal, and also a satisfactory correction processing can be performed even when making the camera shake correction at the same time.

Therefore, in prior art, though the picture-quality deterioration such as the color blurring and resolution lowering due to the chromatic difference of magnification is caused in the miniaturized camera lens, it is difficult to sufficiently suppress only by the camera lens; particularly, when the compensation for picture-quality deterioration is performed by enlarging or reducing the picture of each color, it is impossible to perform the camera shake correction at the same time; however, the present invention can easily overcome those conventional problems.

Consequently, the above-described picture taking apparatus includes: a camera lens, an image pickup means for converting image light passing through the camera lens into an electric image signal, a camera-signal processing means for processing the image signal, a chromatic signal conversion means for converting the output signal from the camera-signal processing means into at least three primary color signals or vice versa, a resolution changing means for enlarging or reducing a picture of each color of the primary color signals, a detection means for detecting the driving state of the camera lens and the amount of camera shake correction, and a control means for controlling the conversion coefficient for enlargement or reduction as well as the optical axis centered coordinate in the resolution changing means depending on a detected output from the detection means, so that the picture-quality deterioration caused in, for example, the miniaturized camera lens can be compensated very satisfactorily.

Moreover, the above-described chromatic aberration correcting method is a method of correcting the chromatic aberration in the picture taking apparatus including a camera lens, an image pickup means for converting image light passing through the camera lens into an electric image signal, and a camera-signal processing means for processing the image signal; and by converting the output signal from the camera-signal processing means into at least three primary color signals, enlarging or reducing a picture of each color of the primary color signals, and also detecting the driving state of the camera lens and the amount of camera shake correction to control the conversion coefficient of enlargement or reduction and the optical axis centered coordinate depending on the detected output, the picture-quality deterioration caused in, for example, the miniaturized camera lens can be compensated very satisfactorily.

It should be noted that the present invention is not limited to the above-described embodiment and various modifications can be made without departing from the spirit of the present invention.

The invention claimed is:

1. An image pick-up apparatus comprising:
a camera lens;
image pickup means for converting image light passing through said camera lens into an electric image signal;
camera-signal processing means for processing said image signal;
chromatic signal converting means for converting an output signal from said camera-signal processing means into at least three primary color signals;
resolution changing means for enlarging or reducing a picture of each color of said primary color signals;
detection means for detecting a driving state of said camera lens and an amount of camera shake correction;
control means for controlling a changing coefficient of enlargement or reduction and an optical axis centered coordinate used in said resolution changing means depending on a detected output from said detection means;
signal conversion means for converting an output signal from said resolution changing means into an image signal for recording; and
recording and reproducing means for recording and reproducing said image signal to be recorded in a recording medium together with information on the driving state of said camera lens and an amount of camera shake correction that are detected by said detection means when taking a picture,
wherein the control means defines a changing coefficient of enlargement or reduction based on a driving state of the camera lens and a position of an optical axis based on an optical axis centered shift vector of the camera lens obtained from camera shake correcting vector and the control means controls said changing coefficient of enlargement or reduction and the optical axis centered coordinate around the position of the optical axis according to the changing coefficient, and
wherein the image pick-up apparatus has a first mode of correcting chromatic aberration when taking a picture and a second mode of correcting chromatic aberration based on reproduced information on the driving state of the camera lens and reproduced amount of camera shake correction.

2. The image pickup apparatus as claimed in claim 1, wherein the recording and reproducing means records identifying information for discriminating the image pick-up apparatus and the image signal.

3. The image pick-up apparatus as claimed in claim 1, further comprising:
selecting means for selecting between a picture before the chromic aberration correction and a picture after the chromatic aberration correction.

4. The image pick-up apparatus as claimed in claim 1, wherein the second mode of chromatic aberration correction is performed when the reproduced identifying information discriminates that the recording and reproduction are performed by the same image pick-up apparatus.

5. A chromatic aberration correcting method in a picture taking apparatus comprising:
converting image light passing through a camera lens into an electric image signal;
processing said image signal;

converting an output signal of the image signal into at least three primary color signals;

enlarging or reducing a picture of each color of said primary color signals detecting a driving state of said camera lens and an amount of camera shake correction to control a conversion coefficient of said enlargement or reduction and an optical axis centered coordinate depending on the detected output;

converting the output signal into an image signal for recording;

recording and reproducing said image signal to be recorded in a recording medium together with information on the driving state of said camera lens and an amount of camera shake correction that are detected when taking a picture;

defining a changing coefficient of enlargement or reduction based on a driving state of the camera lens and a position of an optical axis based on a optical axis centered shift vector of the camera lens obtained from camera shake correcting vector and controlling said changing coefficient of enlargement or reduction and the optical axis centered coordinate around the position of the optical axis according to the changing coefficient; and wherein the picture taking apparatus has a first mode of correcting chromatic aberration when taking a picture and a second mode of correcting chromatic aberration based on reproduced information on the driving state of the camera lens and reproduced amount of camera shake correction.

6. The method as claimed in claim 5, wherein the recording and reproducing step records identifying information for discriminating the image pick-up apparatus and the image signal.

7. The method as claimed in claim 5, further comprising:

selecting between a picture before the chromic aberration correction and a picture after the chromatic aberration correction.

8. The method as claimed in claim 5, wherein the second mode of chromatic aberration correction is performed when the reproduced identifying information discriminates that the recording and reproduction are performed by the same image pick-up apparatus.

* * * * *